United States Patent [19]
Biller et al.

[11] Patent Number: 4,652,012
[45] Date of Patent: Mar. 24, 1987

[54] FITTING FOR A SAFETY BELT FOR MOTOR VEHICLES

[75] Inventors: Dieter Biller, Mutlangen; Michael Stütz, Schwäb. Gmünd-Strassdorf, both of Fed. Rep. of Germany

[73] Assignee: TRW Repa GmbH, Alfdorf, Fed. Rep. of Germany

[21] Appl. No.: 733,141

[22] Filed: May 10, 1985

[30] Foreign Application Priority Data

May 28, 1984 [DE] Fed. Rep. of Germany ....... 3419880
Apr. 25, 1985 [DE] Fed. Rep. of Germany ....... 3514980

[51] Int. Cl.$^4$ .............................................. B60R 21/10
[52] U.S. Cl. .................................... 280/808; 297/483
[58] Field of Search .............. 280/808, 801, 802, 804; 248/123.1, 334.1; 297/483, 468, 469, 484

[56] References Cited

U.S. PATENT DOCUMENTS 4,398,749  8/1983  Hipp ..................................... 280/808
4,456,283  6/1984  Michael ................................ 280/804
4,550,933 11/1985  Patterson ............................. 280/808

FOREIGN PATENT DOCUMENTS 2412253  9/1975  Fed. Rep. of Germany ...... 280/801
2720789 11/1978  Fed. Rep. of Germany ...... 280/808
  29537  2/1984  Japan .................................... 280/801
2081568  2/1982  United Kingdom ................ 280/808

Primary Examiner—John J. Love
Assistant Examiner—Everette G. Diederiks, Jr.
Attorney, Agent, or Firm—Tarolli, Sundheim & Coveil

[57] ABSTRACT

Fitting for a safety belt for motor vehicles. The fitting is mounted on an adjustment element which is vertically adjustable by displacement in a guide rail secured to the vehicle and adapted to be locked to the guide rail at different vertical positions. In this manner an adaptation of the support or deflection point to the size of the vehicle occupant is possible. According to the invention the adjustment element is in connection with a spring force accumulator tensioned with respect to said element and the guide rail, by which accumulator the displacement movement to be made by hand is aided upwardly and the forces originating from the belt and the weight of the adjustment element overcome, and the displacement movement downwardly is loaded, thus compensating for the aforementioned forces.

12 Claims, 6 Drawing Figures

FITTING FOR A SAFETY BELT FOR MOTOR VEHICLES

The invention relates to a fitting for a safety belt for motor vehicles comprising an end or deflection fitting for the belt band including an adjustment element displaceable relative to a guide rail for securing the deflection member or fitting, preferably to a center post, at different heights in accordance with the occupant's size, a manually setting or movable member, and at least one bolt cooperating with the setting member and adapted to be fixed in a predetermined position by detent elements associated with the guide rail. In safety belt systems for motor vehicles it is known to effect vertical adjustment of the support point for a belt band in accordance with the size of a vehicleoccupant, for example in the form of a reversing fitting. To obtain optimum protection for the vehicle occupant it is necessary to be able to adjust the support point downwardly for smaller persons and upwardly for larger persons. Devices which serve this purpose are known in a great variety of constructions. They consist substantially of a guide rail member which is secured for example to the center post of the motor vehicle and in which a slide-like adjustment element is guided for upward and downward displacement and comprises a manually setting member on actuation of which, for example pivoting, a bolt mounted in the adjustment element can be brought out of engagement with a respective detent opening in the guide rail and corresponding upward or downward adjustment can be made. On moving the adjustment element upwardly the entire return pulling force of the belt band tensioned for example at an automatic takeup means acts on said element so that during said movement upwardly said return force and the entire weight of the adjustment element must be overcome by hand. On adjustment downwardly said forces and weights promote the downward displacement movement and this in turn must be compensated by hand.

The invention is based on the problem of improving a fitting in such a manner that in both adjustment directions the manual displacement operation is facilitated and the influence of the aforementioned forces eliminated or minimized. In addition, the fitting is to be made so that with simple constructional means and on movement of the hand setting member in the desired adjustment direction a reliable arresting of the adjustment element in the desired vertical position is obtained.

This problem is solved according to the invention by providing a spring force accumulator which cooperates with the adjustment element and is tensioned between the adjustment element and the guide rail in such a manner that it assists in the upward displacement movement of the adjustment element and resists the downward displacement movement thereof. Advantageous further developments of the invention will be apparent from the description below. The pretensioned spring force accumulator according to the invention, after actuation of the manual setting member provides for displacement of the adjustment element is drawn upward so that for this purpose no manual force or only a negligible manual force is required. The hand need only guide the adjustment element by the manually setting member to find the desired vertical position. Conversely, on displacement of the adjustment element downward the spring force accumulator compensates for the forces acting in this vertical direction by being tensioned and this also has the effect that a minimum of manual force is necessary for adjustment of the fitting and the latter need only be guided by the hand.

The advantageous further development of the invention consists in the construction of the spring force accumulator in the form of a spiral spring. A particularly small and compact design is achieved because this spiral spring and the spring cage thereof require very little space. As tension means a thin flexible cable or a flexible band may be used. In this case as well the spring force of the spiral spring is so calculated that the forces acting on the fitting, for example the reversing or end fitting, are substantially cancelled out.

A particularly simple construction is achieved by forming the spring force accumulator as an elastic rubber cord, a relatively thin tension spring or the like tensioned between the adjustment element and the guide rail, and by providing a deflection roller at the upper end of the guide rail for deflecting the tension element extending between the adjustment element and the lower end of the guide rail. By providing a manually setting member pivotally mounted on the adjustment member and coupled to a bolt which is spring-biased against the guide rail, is arrested by detent openings in the guide rail, and comprises a run-on inclined face, a particularly simple and effective construction of the hand setting and locking means is obtained. The hand setting member pivotal about a pivot axis is always pressed into the direction in which the vertical movement of the adjustment element is to take place. The bolt displaceable relatively to the adjustment element comes out of engagement with the corresponding detent opening in the guide rail and by releasing can again be brought into detent engagement in the new vertical position.

The invention will be explained with the aid of examples of embodiments illustrated in the drawings, wherein.

Figure 1:
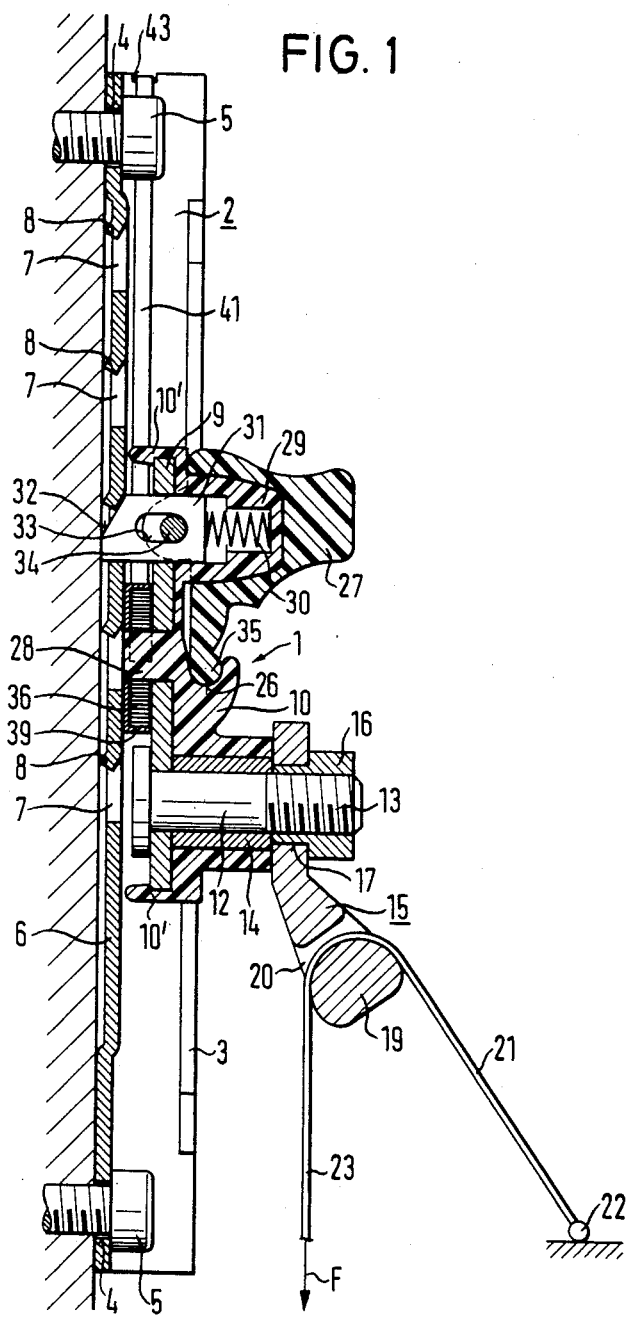
FIG. 1 is a side sectional view of the fitting.
Figure 2:
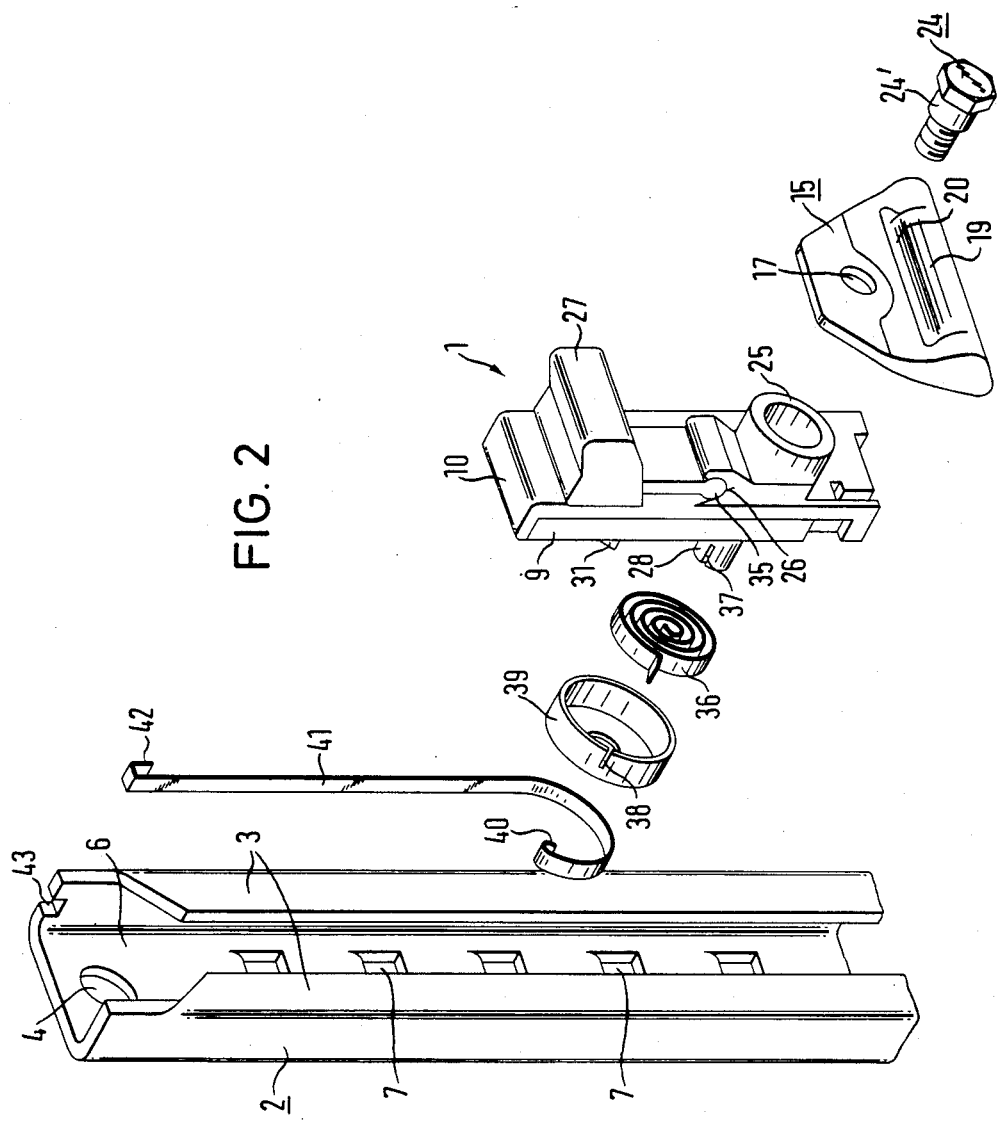
FIG. 2 is an exploded view of the fitting according to FIG. 1.

In all examples of embodiments an adjustment element 1 or 1' is guided vertically adjustably in a substantially U-shaped elongated and metal guide rail 2, said guide rail 2 having inwardly bent guide extensions 3 for holding the adjustment element, securing openings 4 for the securing thereof, for example to the center post of the motor vehicle by means of screws 5, and square detent openings 7 disposed consecutively at different heights in the base plate 6 and each having upper boundary edges 8 which are slightly inclined outwardly as shown by FIG. 1. The adjustment element 1 or 1' has a stable, for example metal baseplate 9, which is surrounded at least partially by a receiving body 10 for example of plastic. Secured or screwed to the baseplate 9 is a support bolt 12 with threaded extension 13 onto which a spacer sleeve 14 and an end or deflection fitting member 15 can be fitted and locked to the support bolt 12 by means of a nut 16. The deflection fitting member 15 comprises a securing opening 17 and a rounded deflection portion 19 with a recess 20 engaging therebehind for the flexible belt band 21 which as schematically indicated is secured with one end 22 fixedly to the motor vehicle and with the other belt run is in connection for example with an automatic takeup device known per se which exerts on said belt run 23 a tension force F. FIG. 2 shows a slightly modified securing of the deflection fitting member 15. For this purpose a threaded shoulder screw 24 is provided and is adapted to be fixedly screwed to a threaded portion not illustrated in detail at the baseplate 9 and receives with the shoulder collar 24' the deflection fitting member 15. The receiving body 10 is formed in the securing region in the manner of a sleeve 25 and encloses for example with snap-action detent extensions 10' the upper and lower edges of the baseplate 9, comprises a pivot bearing 24 for the hand setting member 27 and further an integrally formed bearing journal 28 passing through the baseplate 9 and finally in the opposite direction at the level of the upper baseplate end a dome-shaped integrally formed pocket 29 for a pressure spring 30. A bolt 31 is guided displaceably relatively to the baseplate 9 in a slot-like opening of said plate 9, said bolt having a run-up inclined face 32 and an elongated hole guide 33. Said bolt 31 is pressed by the pressure spring 30 against the baseplate 6 of the guide rail 2. The elongated hole guide 33 of the bolt 31 is traversed by a coupling pin 34 which is a fixed part of a hand setting member 27 pivotal with a pivot extension 35 in the form of a one-armed lever in the pivot bearing 26. For moving the adjustment element 1 upwardly the hand setting member 27 is pressed upwardly and the inclined run-up face 32 runs onto the inclined edge 8 of the corresponding detent opening 7 and the bolt 31 is displaced against the force of the pressure spring 30 and brought out of detent engagement. The adjustment element 1 can be arrested again in one of the following detent openings 7 by the bolt 31 automatically dropping into the corresponding detent opening 7 under the force of the pressure spring. For moving the adjustment element 1 downwardly the hand setting member 27 is pressed downwardly and pivoted about the pivot bearing 26, the bolt thereby being pulled out of the detent opening 7 via the coupling pin 34 and after the vertical adjustment engages again in the detent opening 7 further below only after release of the hand setting member 27.

During the upward movement of the adjustment element 1 the tension force F and the weight of the adjustment element 1 restrict said movement whilst during the downward movement said forces pull the adjustment element 1 downwardly. To compensate for these forces which obstruct selective adjustment in the example of embodiment according to FIGS. 1 and 2 as force accumulator a spiral spring 36 is provided which is mounted on the bearing journal 28 and with the inner hook-like end engaged in a slot 37 of the journal 28 and arrested therein whilst the other likewise hook-shaped end is engaged in a corresponding slot of a pot-shaped spring cage 39 in which the spiral spring 36 is disposed. Engaged in this or a further slot 38 in the spring cage 39 is the hook-shaped end 40 of a flexible coilable pulling or tension means 41 for example in the form of a flexible flat band. Said tension means 41 also comprises at the other end an engagement hook 42 with which the tension means 41 is engaged for example at the point 43 in the guide rail. The spiral spring 36 is pretensioned via the tension means 41 so that on movement of the adjustment element 1 upwardly said element is drawn upwardly by the force of the pretensioned spiral spring 36, overcoming the forces originating from the belt band 21 and the weight of the adjustment element 1, the tension means 41 coiling up on the outer periphery of the spring cage 39. On movement of the adjustment element 1 downwardly the spiral spring 36 is further tensioned via the tension means 41, again compensating for the aforementioned forces.

Figure 3:
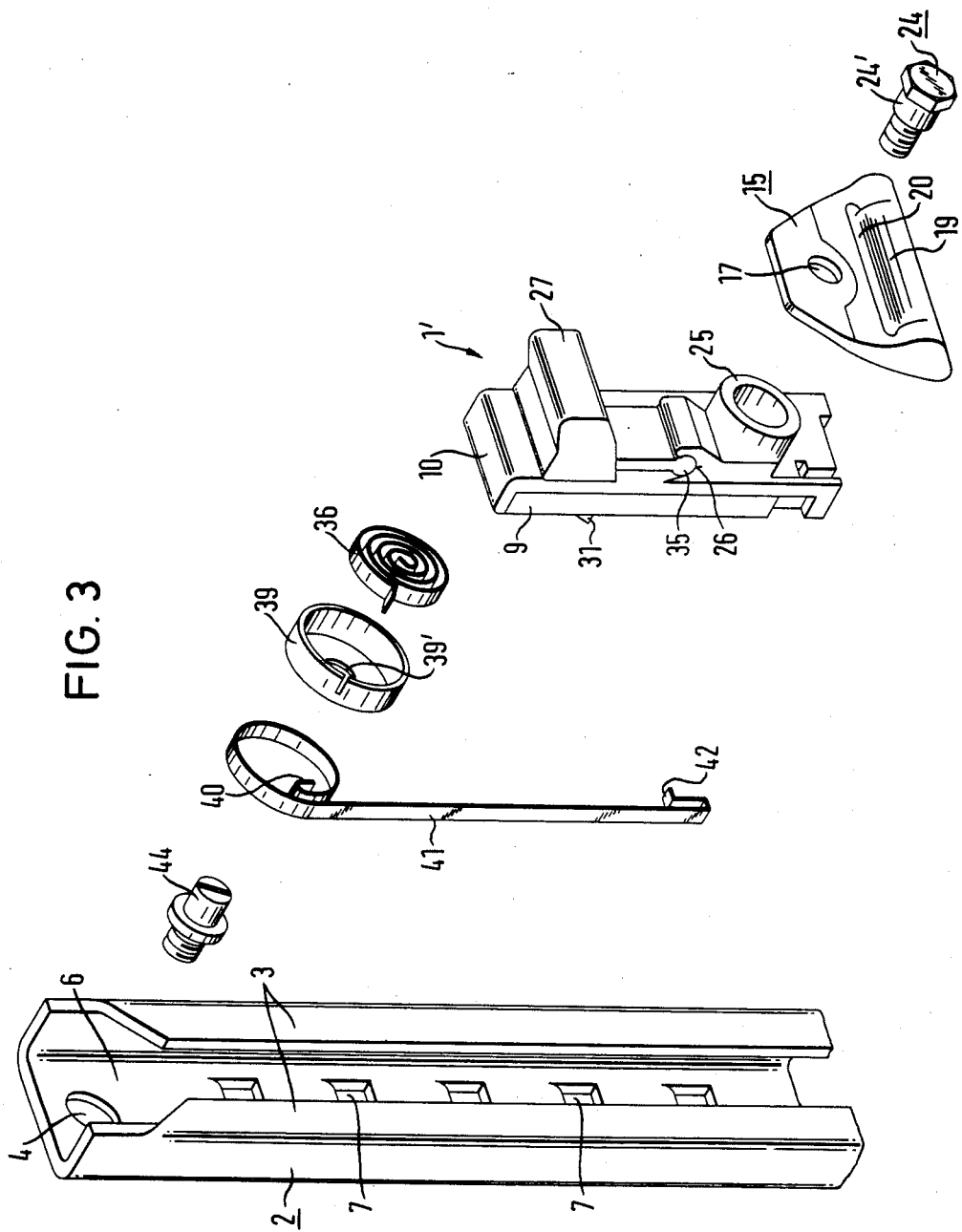
FIG. 3 is an exploded view of a modified example of embodiment of the fitting.

The example of embodiment according to FIG. 3 differs essentially only in the arrangement of the force accumulator, i.e. spiral spring 36 and spring cage 39. A shoulder screw 44 serves as bearing for these parts and is adapted to be screwed to the guide rail 2. Mounted on the bearing shoulder of the screw 44 is the spiral spring 36 connected at one end thereto and the spring cage 39 having a corresponding bearing opening 39'. Coiled on the outer periphery of the spring cage 39 and connected thereto is the tensionmeans 41, reversed in this example of embodiment, the engagement hook 42 of which is engaged in the adjustment element 1'. The mode of operation of this means is the same as with the example of embodiment according to FIGS. 1 and 2.

Figure 4:
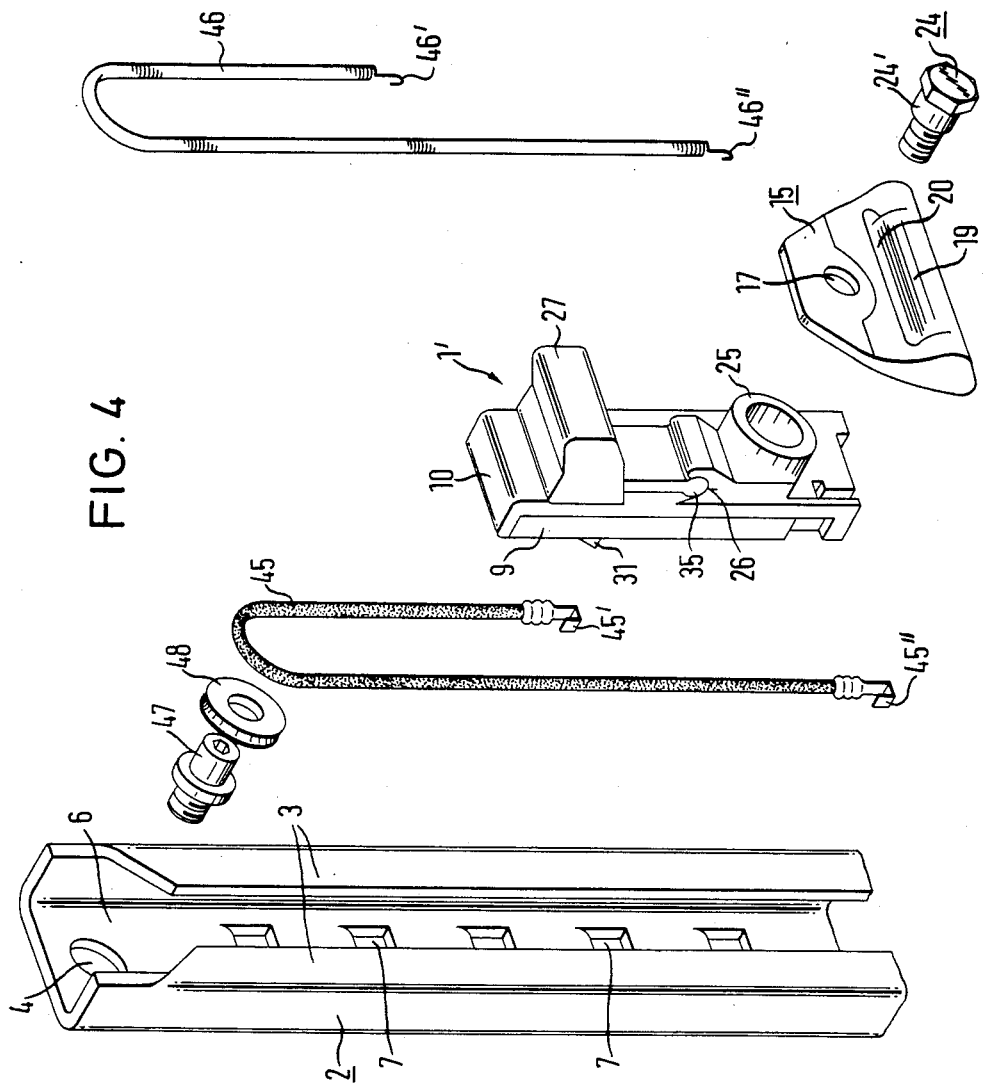
FIGS. 4, 5 & 6 show different embodiments of the fitting according to the invention, in each case in exploded view.

In the example of the embodiment according to FIG. 4 an already described adjustment element 1' is guided vertically adjustably in the guide rail 2. In this case the force accumulator is an elongated flexible spring tension means in the form of a rubber cord 45 or in the form of a thin tension spring 46. The spring tension means is suspended with the one engagement hook 45' or 46' in the adjustment element 1', is deflected through 180° at a deflection roller mounted freely rotatably on a shoulder screw 47 of the guide rail 2 and with the other engagement hook 45'' or 46'' is secured to the lower end of the guide rail 2. In this case as well the spring tension means 45 and 46 is pretensioned in such a manner that the aforementioned forces restricting a movement are compensated.

Figure 5:
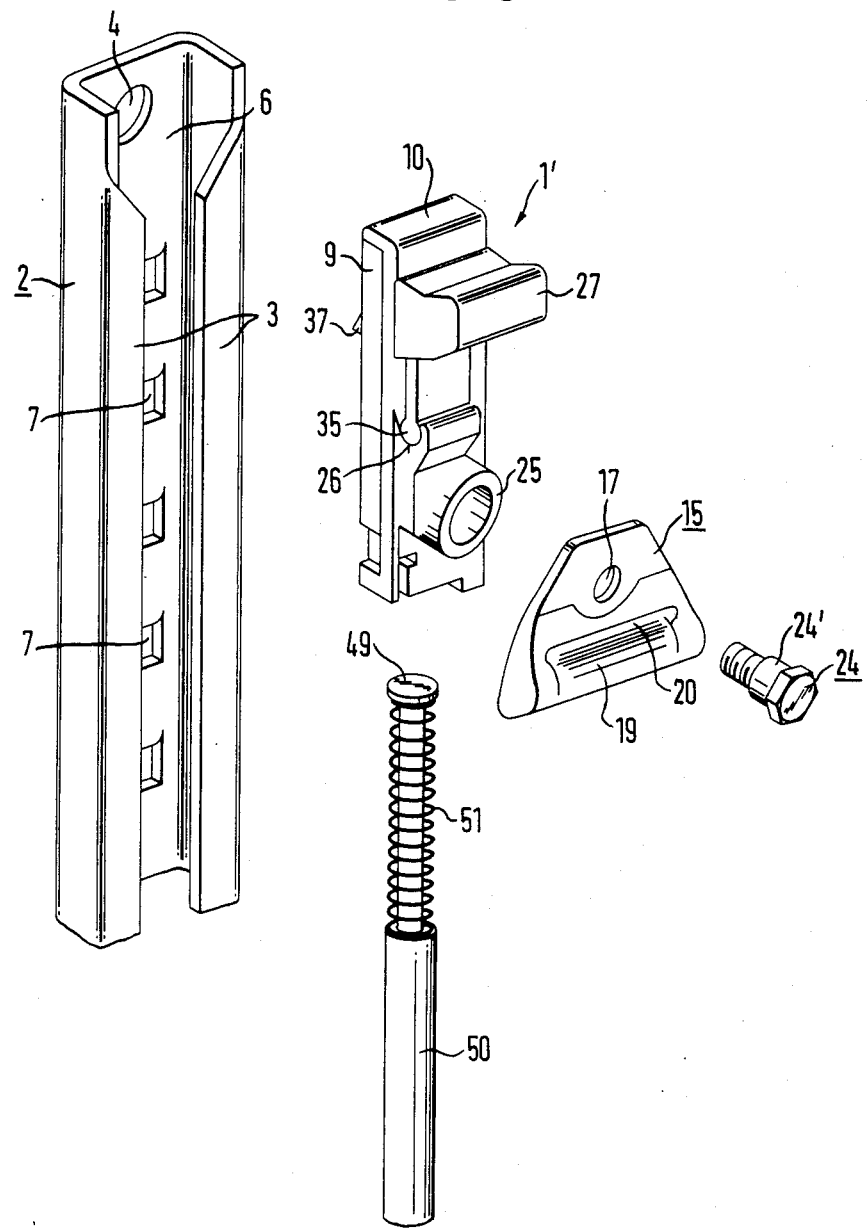

In the example of embodiment according to FIG. 5 as well the adjustment element 1' is again vertically displaceable in the guide rail 2. The spring force accumulator in this example of embodiment is a push rod 49 which is displaceably guided in a sleeve 50, a pretensioned pressure spring 51 being disposed between the sleeve 50 and the widened end of the push rod 49. The sleeve 50 is secured to the guide rail 2 or to another suitable point of the vehicle.

With its end the pressure rod 49 presses on the lower edge of the adjustment element 1' and by the pressure spring 51 said adjustment element is pressed upwardly. In this case as well the aforementioned forces are completely or at least very substantially compensated for by this spring force accumulator.

Figure 6:
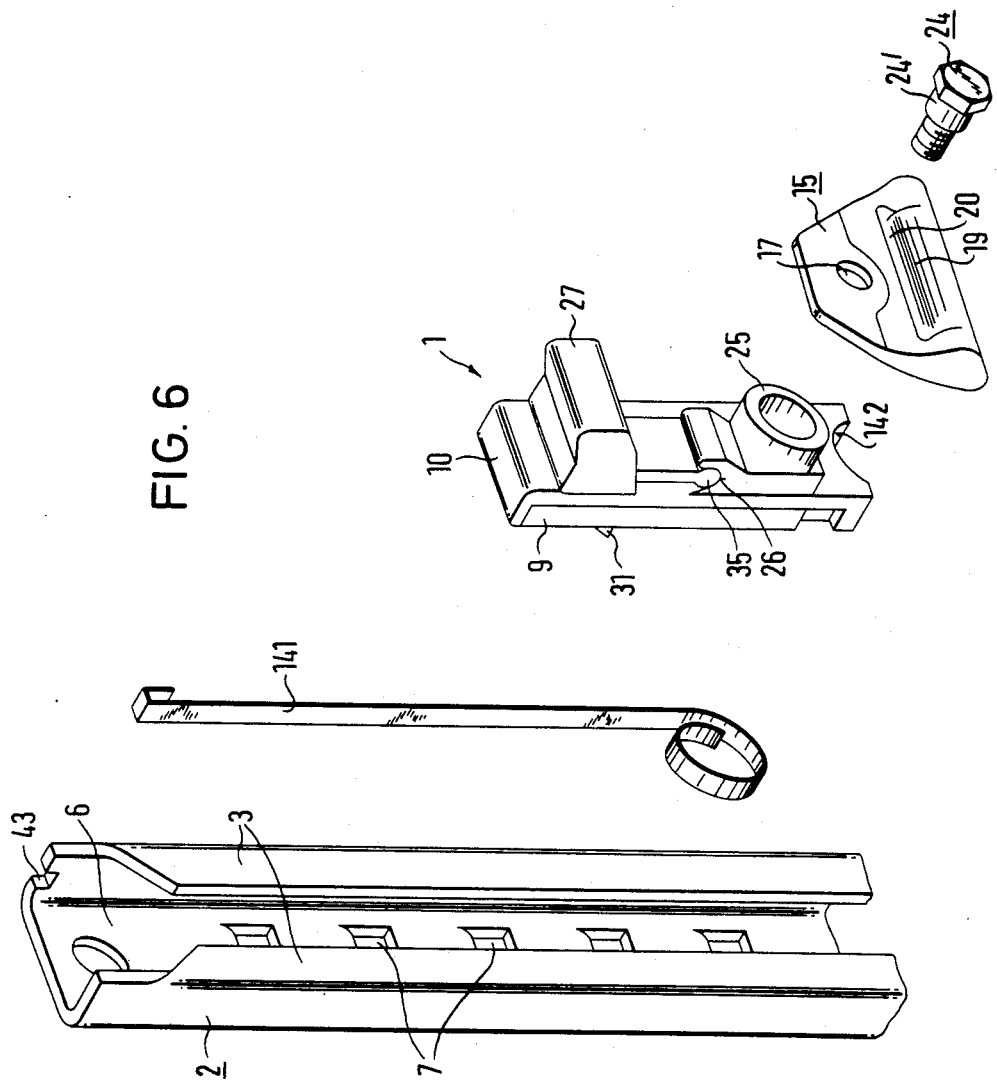

The embodiment shown in FIG. 6 is a variant of the embodiment of FIG. 3. Instead of the unit formed by spiral spring 36, spring cage 39 and tension means 41 in the embodiment of FIG. 3 in this case a roll spring 141 is provided which consists of a coiled spring strip which tends to roll up spirally. The outer end of the scroll or roll spring 141 is constructed like the corresponding end of the tension means 41 in FIG. 3 in hook-shaped manner and engaged in the recess 43 of the guide rail. The spirally coiled portion of the roll spring 141 is accommodated in a circular-segment-shaped recess 142 at the lower narrow side of the receiving body 10. In this recess 142 the spirally coiled portion of the roll spring 141 can rotate freely so that the roll spring 141 can freely coil up and uncoil on movement of the receiving body. The embodiment according to FIG. 6 is distinguished by its simplicity both as regards production and as regards assembly.

We claim:

1. Fitting for a safety belt for motor vehicles comprising a deflection member defining a support point for the safety belt and means for securing said deflection member at different heights relative to the vehicle to accommodate different sizes of vehicle occupants, said securing means comprising a guide rail, an adjustment member supporting said deflection member and displaceable relative to said guide rail, a manually movable member for displacing said adjustment member, at least one bolt for locking said adjustment member in a selected predetermined position relative to said guide rail, and a spring force accumulator tensioned between said adjustment member and said guide rail for assisting the upward displacement of the adjustment member and resisting the downward displacement thereof, said spring force accumulator comprising a spiral spring having one end thereof secured to one of said adjustment member and said guide rail, a spring cage to which the other end of said spiral spring is secured, and a flexible coilable tension means having one end secured to said spring cage and the other end secured to the other of said guide rail and adjustment member.

2. Fitting according to claim 1 wherein the said adjustment member includes a bearing journal for supporting said spiral spring and said spring cage.

3. Fitting for a safety belt for motor vehicles comprising a deflection member defining a support point for the safety belt and means for securing said deflection member at different heights relative to the vehicle to accommodate different sizes of vehicle occupants, said securing means comprising a guide rail, an adjustment member supporting said deflection member and displaceable relative to said guide rail, a manually movable member for displacing said adjustment member, at least one bolt for locking said adjustment member in a predetermined position relative to said guide rail, spring means for biasing said bolt into engagement with said guide rail, and a spring force accumulator tensioned between said adjustment member and said guide rail for assisting the upward displacement of the adjustment member and resisting the downward displacement thereof, said adjustment member comprising means for pivotably mounting said manually movable member and a coupling pin for coupling said manually movable member to said bolt, said guide rail comprising detent openings for selectively receiving said one bolt, said bolt having an inclined end surface for movement relative to the detent openings and an elongated slot for receiving said coupling pin.

4. The fitting of claim 3 wherein said spring force accumulator comprises flexible spring tension means such as a rubber cord or a tension spring tensioned between said adjustment member and said guide rail.

5. The fitting of claim 4 further comprising a deflection roller for deflecting said flexible spring tension means and disposed at the upper end of said guide rail, said flexible spring tension means having one end engaging said adjustment member and another end engaging said guide rail at the lower end thereof.

6. The fitting of claim 3 wherein said spring force accumulator comprises a sring-loaded pull or push rod engaging said adjustment member, said pull or push rod comprising a sleeve secured to said guide rail or the body of the motor vehicle.

7. The fitting of claim 3 wherein said spring force accumulator comprises a roll spring in the form of an at least partially spirally coiled spring strip, the spirally coiled portion of said roll spring being secured to one of said adjustment member and guide rail and the free end of said roll spring being secured to the other of said adjustment member and guide rail.

8. The fitting of claim 7 wherein said spirally coiled portion of said roll spring is accommodated in a circular-segment shaped recess in said adjustment member.

9. A device for supporting a deflection member of a safety belt on the body of a motor vehicle in different vertical positions, said device comprising a guide rail secured on the body of the motor vehicle, an adjustment member slidably displaceable relative to said guide rail, said adjustment member including means for supporting said deflection member, detent means for selectively locking said adjustment member in any of said vertical positions, a spiral spring engaged between said guide rail and said adjustment member for assisting upward displacement of said adjustment member on said guide rail, a spring cage, said spiral spring having a first end secured to one of said adjustment member and said guide rail and a second end secured to said spring cage, a flexible coilable tension means having one end portion secured to the other of said guide rail and said adjustment member and the other end portion attached to said spring cage and coilable on the periphery of said spring cage, and a bearing journal for rotatably supporting said spring cage.

10. The device of claim 9 wherein said bearing journal is mounted on said adjustment member.

11. The device of claim 9 wherein said bearing journal is mounted on said guide rail.

12. A device for supporting a deflection member of a safety belt on the body of a motor vehicle in different vertical positions, said device comprising a guide rail secured on the body of the motor vehicle, an adjustment member slidably displaceable relative to said guide rail, said adjustment member including means for supporting said deflection member, detent means for selectively locking said adjustment member in any of said vertical positions, and a spiral spring engaged between said guide rail and said adjustment member for assisting upward displacement of said adjustment member on said guide rail, said spiral spring comprising a spring strip having a spirally coiled end portion and a straight end portion said spirally coiled end portion being connected to said adjustment member and said straight end portion being secured to said guide rail, said spirally coiled end portion being located in a circular-segment-shaped recess in said adjustment member.

* * * * *